United States Patent
Ikeda

(10) Patent No.: US 11,032,299 B2
(45) Date of Patent: Jun. 8, 2021

(54) LOG ANALYSIS SYSTEM, ANALYSIS DEVICE, ANALYSIS METHOD, AND STORAGE MEDIUM ON WHICH ANALYSIS PROGRAM IS STORED

(71) Applicant: NEC CORPORATION, Tokyo (JP)

(72) Inventor: Satoshi Ikeda, Tokyo (JP)

(73) Assignee: NEC CORPORATION, Tokyo (JP)

(*) Notice: Subject to any disclaimer, the term of this patent is extended or adjusted under 35 U.S.C. 154(b) by 160 days.

(21) Appl. No.: 15/555,214

(22) PCT Filed: Mar. 1, 2016

(86) PCT No.: PCT/JP2016/001100
§ 371 (c)(1),
(2) Date: Sep. 1, 2017

(87) PCT Pub. No.: WO2016/139932
PCT Pub. Date: Sep. 9, 2016

(65) Prior Publication Data
US 2018/0041531 A1 Feb. 8, 2018

(30) Foreign Application Priority Data
Mar. 3, 2015 (JP) .............................. JP2015-041454

(51) Int. Cl.
*G06F 21/55* (2013.01)
*H04L 29/06* (2006.01)

(52) U.S. Cl.
CPC ........ H04L 63/1425 (2013.01); G06F 21/552 (2013.01); H04L 63/1416 (2013.01);
(Continued)

(58) Field of Classification Search
CPC ............. H04L 63/1425; H04L 63/1416; H04L 63/0236; H04L 63/108; H04L 63/145;
(Continued)

(56) References Cited

U.S. PATENT DOCUMENTS 6,052,728 A * 4/2000 Fujiyama ................ H04L 41/00
709/224
7,120,927 B1 * 10/2006 Beyda ..................... H04L 51/12
726/2
(Continued)

FOREIGN PATENT DOCUMENTS

| JP | 10-224349 | 8/1998 |
| JP | 2013-191133 | 9/2013 |

OTHER PUBLICATIONS

International Search Report, PCT/JP2016/001100, dated May 24, 2016.
(Continued)

*Primary Examiner* — Techane Gergiso
(74) *Attorney, Agent, or Firm* — Sughrue Mion, PLLC

(57) ABSTRACT

To provide a log analysis system which is capable of detecting unauthorized access, an analysis device, an analysis method and a storage medium on which an analysis program is stored, a client terminal communicates with an external communication device. A relay device relays communications between the external communication device and the client terminal, in accordance with a request from the client terminal. An analysis device analyzes the content of communications by the client terminal. Then, the client terminal stores program information indicating a program that handled communications with the external communication device. The relay device stores a relay log that indicates each request, made by the client terminal, to communicate with the external communication device. In addition, the analysis device compares the program information and the relay log.

9 Claims, 16 Drawing Sheets

(52) U.S. Cl.
CPC ........ *H04L 63/0236* (2013.01); *H04L 63/108* (2013.01); *H04L 63/145* (2013.01); *H04L 2463/144* (2013.01)

(58) Field of Classification Search
CPC ............... H04L 2463/144; H04L 67/28; H04L 12/4641; H04L 12/4675; G06F 21/552
See application file for complete search history.

(56) References Cited

U.S. PATENT DOCUMENTS

| | | | | |
|---|---|---|---|---|
| 8,079,030 | B1 | 12/2011 | Satish et al. | |
| 9,401,945 | B2* | 7/2016 | Kato | H04N 21/4882 |
| 2002/0143956 | A1* | 10/2002 | Tanimoto | H04L 67/14 |
| | | | | 709/227 |
| 2004/0107272 | A1* | 6/2004 | Manukyan | G06F 9/44505 |
| | | | | 709/221 |
| 2004/0153549 | A1* | 8/2004 | Naito | H04L 29/06 |
| | | | | 709/228 |
| 2004/0243712 | A1* | 12/2004 | Sakai | H04L 41/00 |
| | | | | 709/227 |
| 2006/0179000 | A1* | 8/2006 | Aihara | H04L 63/0428 |
| | | | | 705/52 |
| 2006/0195611 | A1* | 8/2006 | Howe | H04L 41/024 |
| | | | | 709/245 |
| 2007/0002829 | A1* | 1/2007 | Chang | H04L 29/06027 |
| | | | | 370/352 |
| 2007/0118568 | A1* | 5/2007 | Kitani | H04L 41/12 |
| 2007/0162596 | A1* | 7/2007 | Sekiguchi | H04L 43/0811 |
| | | | | 709/224 |
| 2008/0037457 | A1* | 2/2008 | Matsukura | H04B 7/155 |
| | | | | 370/315 |
| 2008/0104241 | A1* | 5/2008 | Kodama | H04L 63/145 |
| | | | | 709/225 |
| 2011/0119371 | A1* | 5/2011 | Toshima | G06F 21/552 |
| | | | | 709/224 |
| 2011/0314099 | A1* | 12/2011 | Imai | H04L 12/1822 |
| | | | | 709/204 |
| 2012/0005743 | A1* | 1/2012 | Kitazawa | H04L 63/1425 |
| | | | | 726/13 |
| 2012/0057602 | A1* | 3/2012 | Tanimoto | H04L 12/4641 |
| | | | | 370/401 |
| 2012/0151059 | A1* | 6/2012 | Tanimoto | H04L 12/2898 |
| | | | | 709/225 |
| 2012/0254389 | A1* | 10/2012 | Amemiya | H04L 67/1027 |
| | | | | 709/223 |
| 2012/0287937 | A1* | 11/2012 | Kaya | H04L 45/22 |
| | | | | 370/401 |
| 2013/0094513 | A1* | 4/2013 | Shiraki | H04L 49/3009 |
| | | | | 370/395.53 |
| 2013/0238813 | A1* | 9/2013 | Tanimoto | H04L 63/0236 |
| | | | | 709/238 |
| 2014/0161132 | A1* | 6/2014 | Tatsumi | H04L 49/557 |
| | | | | 370/401 |
| 2014/0298415 | A1* | 10/2014 | Xie | H04L 61/2589 |
| | | | | 726/3 |
| 2014/0337951 | A1* | 11/2014 | Lee | H04L 63/08 |
| | | | | 726/7 |
| 2015/0256458 | A1* | 9/2015 | Shiraki | H04L 49/3009 |
| | | | | 370/392 |
| 2016/0142952 | A1* | 5/2016 | Nakata | H04W 36/0061 |
| | | | | 455/438 |

OTHER PUBLICATIONS

Takumi Yamamoto et al., "Proposal of a Method Detecting Malicious Process", CSS2013 Computer Security Symposium 2013 Ronbunshu [CD-ROM], Oct. 14, 2013 (Oct. 14, 2013), vol. 2013, No. 4, pp. 634 to 641.
Office Action issued in Japanese Patent Application No. 2017-503345 dated Oct. 15, 2019, with English translation provided.
Kamiya "Detecting malware-infected devices using Firewall logs," Information Processing Society of Japan, National Conference, Mar. 17, 2016, p. 3-433 to 3-434.

* cited by examiner

Fig. 3

| REQUEST TIME INFORMATION (START) | CONNECTION IDENTIFIER | | CONNECTION DESTINATION |
|---|---|---|---|
| | IP ADDRESS | PORT NUMBER | |
| 09:00:12 | 10.1.0.1 | 20010 | malicious.example.com:80 |
| 09:00:13 | 10.1.0.1 | 10001 | legal.example.net:80 |
| 09:05:10 | 10.1.0.1 | 30100 | web1.example.jp:80 |
| 09:06:05 | 10.1.0.1 | 30200 | web2.example.jp:443 |
| 09:10:30 | 10.1.0.1 | 10002 | legal.example.net:80 |
| 09:11:10 | 10.1.0.1 | 10003 | clean.example.com:80 |
| 10:15:01 | 10.1.0.1 | 20020 | malicious.example.net:80 |

Fig. 5

| CONNECTION TIME INFORMATION (START) | CONNECTION IDENTIFIER | | PROGRAM INFORMATION (PATH) |
|---|---|---|---|
| | IP ADDRESS | PORT NUMBER | |
| 09:00:12 | 10.1.0.1 | 20010 | /Temp/malware.exe |
| 09:00:13 | 10.1.0.1 | 10001 | /Programs/legal.exe |
| 09:05:10 | 10.1.0.1 | 30100 | /Programs/browser.exe |
| 09:06:05 | 10.1.0.1 | 30200 | /Programs/browser.exe |
| 09:10:30 | 10.1.0.1 | 10002 | /Programs/legal.exe |
| 09:11:10 | 10.1.0.1 | 10003 | /Programs/legal.exe |
| 10:15:01 | 10.1.0.1 | 20020 | /Temp/malware.exe |

Fig. 7

| TIME INFORMATION (START) | CONNECTION IDENTIFIER | | PROGRAM INFORMATION (PATH) | CONNECTION DESTINATION |
|---|---|---|---|---|
| | IP ADDRESS | PORT NUMBER | | |
| 09:00:12 | 10.1.0.1 | 20010 | /Temp/malware.exe | malicious.example.com:80 |
| 09:00:13 | 10.1.0.1 | 10001 | /Programs/legal.exe | legal.example.net:80 |
| 09:05:10 | 10.1.0.1 | 30100 | /Programs/browser.exe | web1.example.jp:80 |
| 09:06:05 | 10.1.0.1 | 30200 | /Programs/browser.exe | web2.example.jp:443 |
| 09:10:30 | 10.1.0.1 | 10002 | /Programs/legal.exe | legal.example.net:80 |
| 09:11:10 | 10.1.0.1 | 10003 | /Programs/legal.exe | clean.example.com:80 |
| 10:15:01 | 10.1.0.1 | 20020 | /Temp/malware.exe | malicious.example.net:80 |

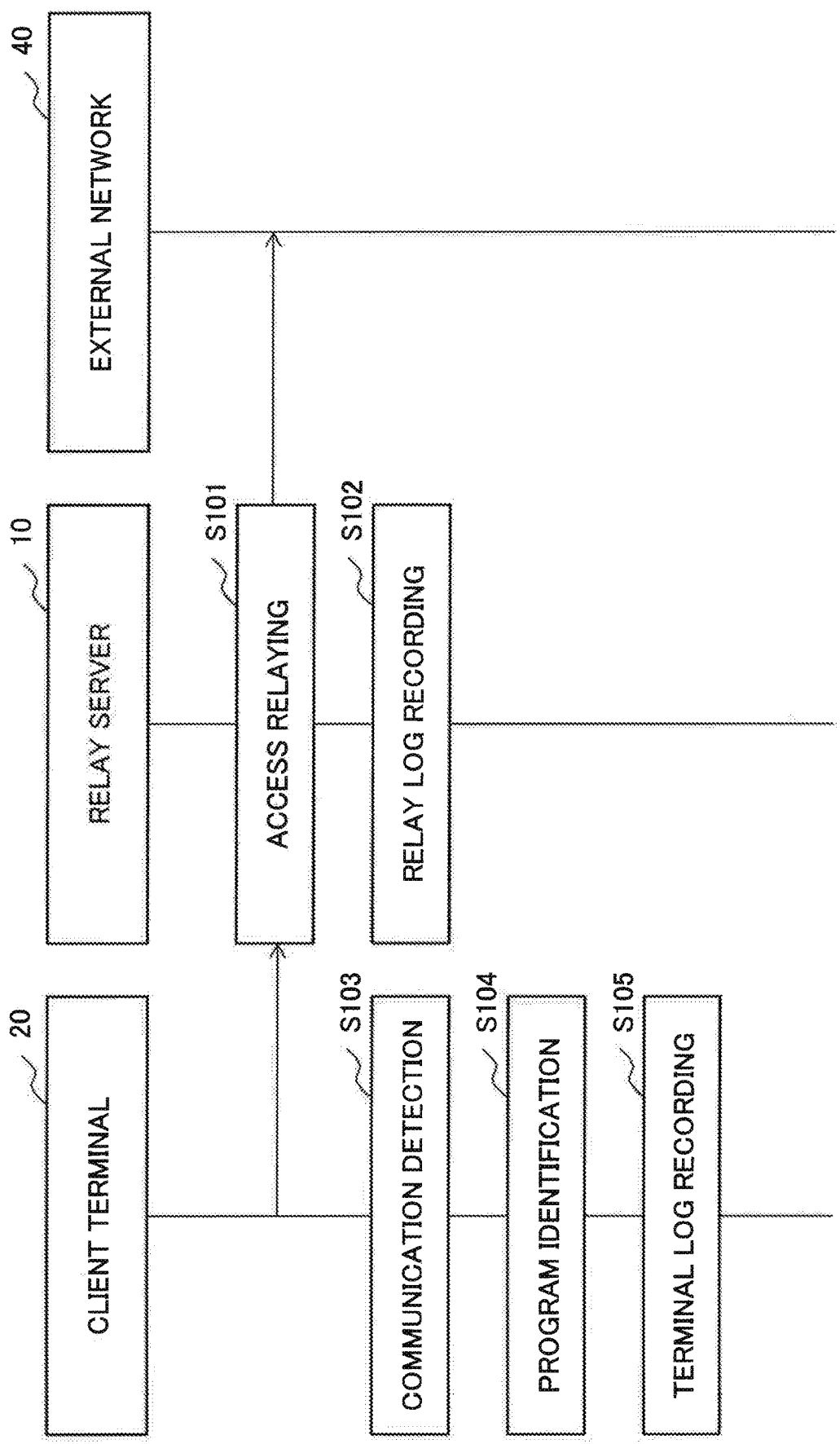

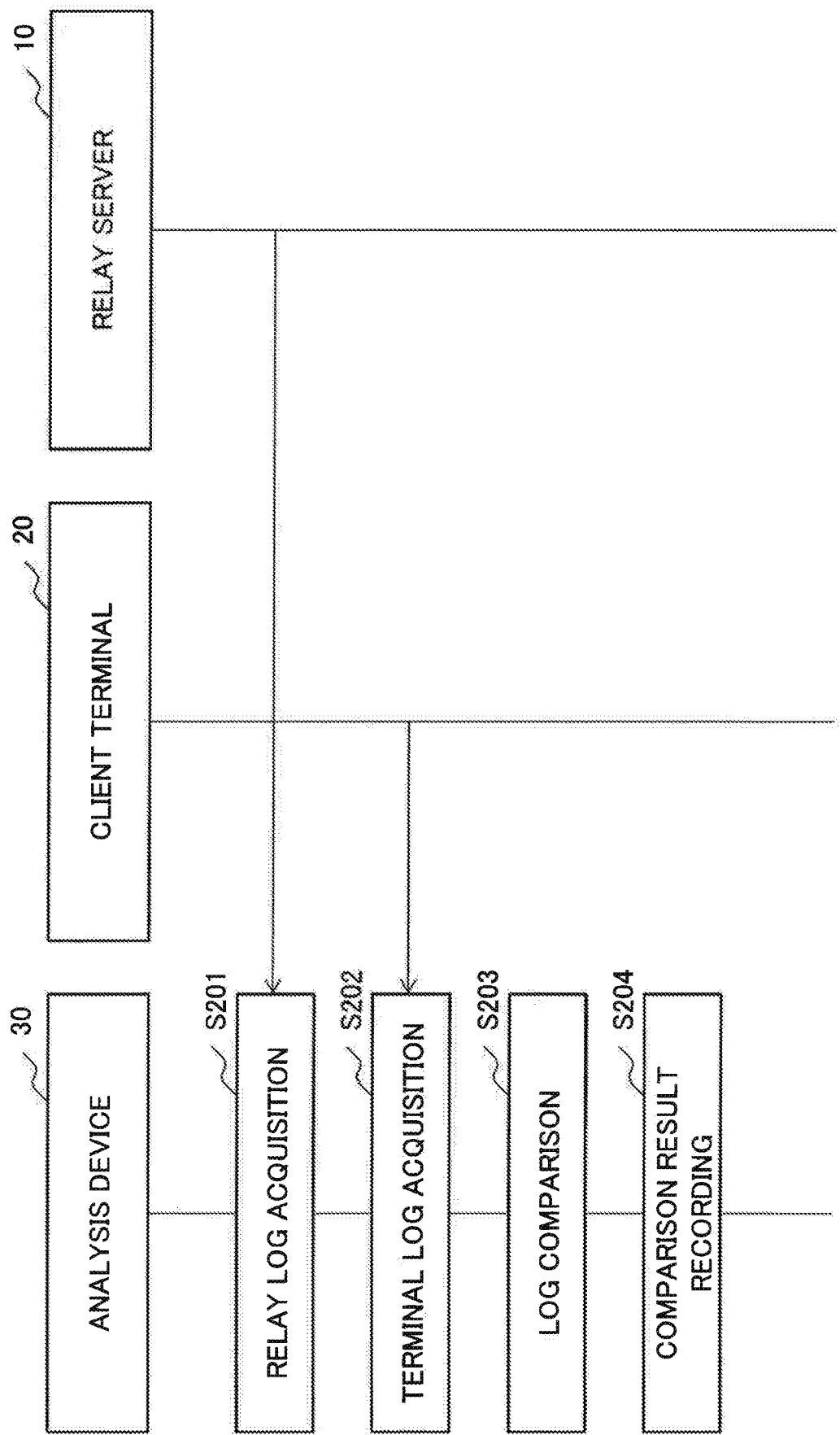

Fig. 13

| CONNECTION TIME INFORMATION (START) | CONNECTION IDENTIFIER | | PROGRAM INFORMATION (PATH) |
|---|---|---|---|
| | IP ADDRESS | PORT NUMBER | |
| 09:00:12 | 10.1.0.1 | 20010 | /Temp/malware.exe |
| 09:00:13 | 10.1.0.1 | 10001 | /Programs/legal.exe |
| 09:10:30 | 10.1.0.1 | 10002 | /Programs/legal.exe |
| 09:11:10 | 10.1.0.1 | 10003 | /Programs/legal.exe |
| 10:15:01 | 10.1.0.1 | 20020 | /Temp/malware.exe |

Fig. 14

| TIME INFORMATION (START) | CONNECTION IDENTIFIER | | PROGRAM INFORMATION (PATH) | CONNECTION DESTINATION |
|---|---|---|---|---|
| | IP ADDRESS | PORT NUMBER | | |
| 09:00:12 | 10.1.0.1 | 20010 | /Temp/malware.exe | malicious.example.com:80 |
| 09:00:13 | 10.1.0.1 | 10001 | /Programs/legal.exe | legal.example.net:80 |
| 09:05:10 | 10.1.0.1 | 30100 | | web1.example.jp:80 |
| 09:06:05 | 10.1.0.1 | 30200 | | web2.example.jp:443 |
| 09:10:30 | 10.1.0.1 | 10002 | /Programs/legal.exe | legal.example.net:80 |
| 09:11:10 | 10.1.0.1 | 10003 | /Programs/legal.exe | clean.example.com:80 |
| 10:15:01 | 10.1.0.1 | 20020 | /Temp/malware.exe | malicious.example.net:80 |

LOG ANALYSIS SYSTEM, ANALYSIS DEVICE, ANALYSIS METHOD, AND STORAGE MEDIUM ON WHICH ANALYSIS PROGRAM IS STORED

TECHNICAL FIELD

The present invention relates to a log analysis system, an analysis device, and an analysis method, and a recording medium storing a program for the analysis for analyzing communication logs.

BACKGROUND ART

In a communication network within an organization such as an enterprise, there may occur a security incident where an apparatus connected to the communication network is infected with a computer virus or information leaks out from an apparatus. When such a security incident occurs, it is necessary to investigate a cause of the incident and recognize a range of the influence, by analyzing a trace such as a log recorded in the apparatus of concern.

Particularly, in a case of an incident where the communication network receives an unauthorized access from the outside or information leaks out to the outside, communication is performed between a client terminal connected to the communication network and an apparatus connected to a communication network outside the communication network (hereafter, referred to also as simply an external network). Accordingly, for investigation of such an incident, a log of communication between an apparatus connected to the communication network and an external network is very important.

One example of such a log of communication between an apparatus connected to the communication network and the outside is an access log of a proxy server. In a communication network within an enterprise or the like where communication to the outside is restricted by firewalls and the like, HTTP (Hypertext Transfer Protocol) communication via a proxy server is one of a limited number of communication paths with the outside.

Patent Literature 1 (PTL 1) describes a method of detecting an unauthorized access on the basis of an access log recorded by a communication terminal, a terminal operation log representing the content of operation performed by a user of the communication terminal and a proxy log recorded by a proxy server.

CITATION LIST

Patent Literature

[PTL 1] Japanese Laid-Open Patent Application No. 2013-191133

SUMMARY OF INVENTION

Technical Problem

However, only limited information can be obtained from an access log of a proxy server. HTTP communication with the outside can be made via a proxy server. Accordingly, when communicating with a C&C (Command and Control) server which issues an attack command against malware, malware uses an HTTP protocol in rather many cases, instead of using a dedicated protocol.

When such communication is made, the access time, the IP (Internet Protocol) address of a client terminal, the name of a connection destination server, and the like, are recorded as an access log in the proxy server. However, from only those kinds of information, it is difficult to determine whether an access recorded in the access log is a proper access by a safe program such as a web browser or is an unauthorized access by malware.

Generally, a large portion of such an access log in a proxy server results from accesses by a web browser. Accordingly, it is difficult to distinguish between proper communication made by a web browser and communication by an unauthorized access made by software other than the web browser, such as malware, on the basis of information included in an access log which is limited in the number of types while is large in amount, like in the method described in PTL 1. As a result, such a method cannot detect an unauthorized access.

In view of that fact, the present invention is aimed at providing a log analysis system, an analysis device, and an analysis method, and a recording medium storing a program for analysis which are capable of detecting an unauthorized access.

Solution to Problem

A log analysis system, according to the present invention, comprises:
a client terminal configured to communicate with external communication apparatuses;
a relay apparatus configured to relay communication between the external communication apparatuses and the client terminal, in response to a request from the client terminal; and
an analysis device configured to analyze content of communication performed by the client terminal, wherein:
the client terminal records program information representing programs having handled communication with the external communication apparatuses;
the relay apparatus records a relay log representing each request from the client terminal for communication with the external communication apparatuses; and
the analysis device compares the program information with the relay log.

An analysis device, according to the present invention, comprises:
a comparison means for comparing program information recorded by a client terminal configured to communicate with external communication apparatuses, the program information representing programs having handled communication with the external communication apparatuses, with a relay log recorded by a relay apparatus configured to relay communication between the external communication apparatuses and the client terminal in response to a request from the client terminal, the relay log representing each request from the client terminal for communication with the external communication apparatuses.

An analysis method, according to the present invention, comprises:
comparing program information recorded by a client terminal configured to communicate with external communication apparatuses, the program information representing programs having handled communication with the external communication apparatuses, with a relay log recorded by a relay apparatus configured to relay communication between the external communication apparatuses and the client terminal in response to a request from the client terminal, the relay log representing each request from the client terminal for communication with the external communication apparatuses.

A recording medium, according to the present invention, storing a program for causing a computer to execute:

comparing program information recorded by a client terminal configured to communicate with external communication apparatuses, the program information representing programs having handled communication with the external communication apparatuses, and a relay log recorded by a relay apparatus configured to relay communication between the external communication apparatuses and the client terminal in response to a request from the client terminal, the relay log representing each request from the client terminal for communication with the external communication apparatuses.

Advantageous Effects of Invention

According to the present invention, it becomes possible to detect an unauthorized access.

BRIEF DESCRIPTION OF DRAWINGS

FIG. 3 is a diagram showing an example of a relay log recorded in a relay log storage unit.

FIG. 5 is a diagram showing an example of a terminal log recorded in a terminal log storage unit.

FIG. 7 is a diagram showing an example of comparison result information representing a comparison result stored in a comparison result recording unit.

FIG. 8 is a sequence diagram showing a log recording process where the relay server and the client terminal each record a log, in the communication system of the first example embodiment of the present invention.

FIG. 9 is a sequence diagram showing a comparison process where the analysis device acquires and compare recorded logs, in the communication system of the first example embodiment of the present invention.

FIG. 13 is a diagram showing an example of a terminal log after an update process is performed.

FIG. 14 is a diagram showing a result of comparison between the terminal log shown in FIG. 13 and the relay log shown in FIG. 3.

DESCRIPTION OF EMBODIMENTS

Example Embodiment 1

Figure 1:
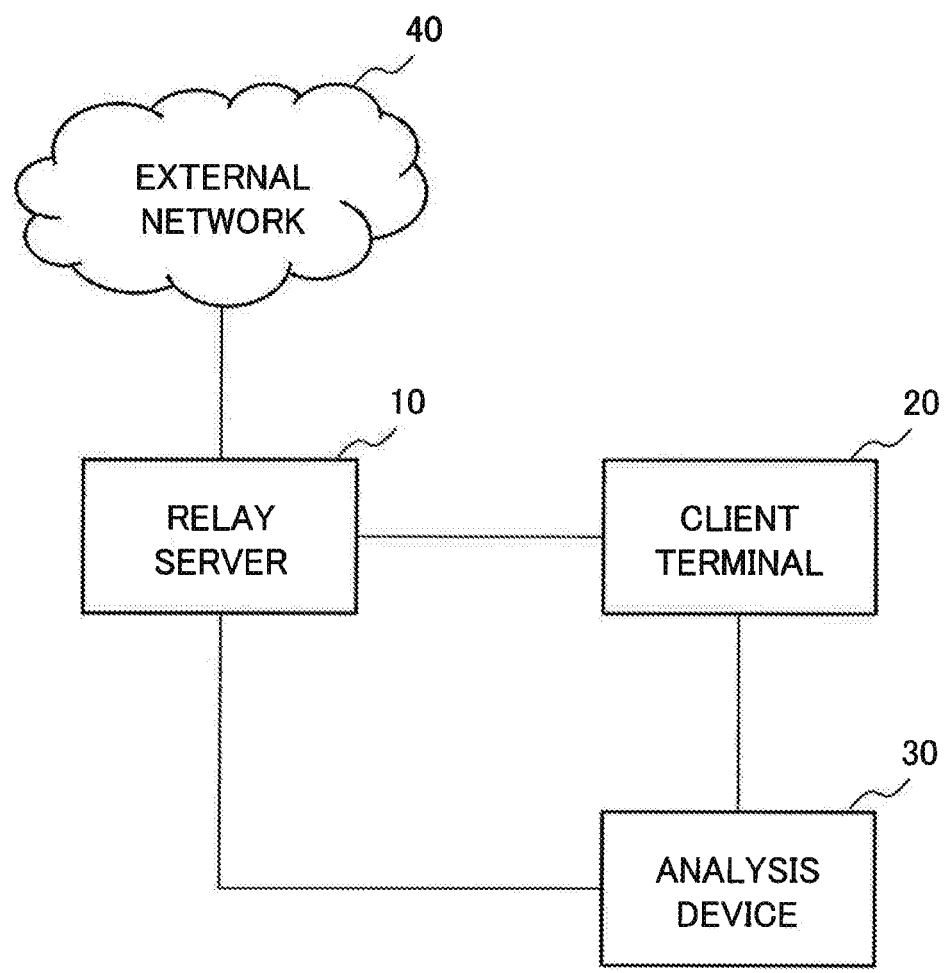
FIG. 1 is a block diagram showing an example of a configuration of a communication system of a first example embodiment of the present invention.

A communication system of a first example embodiment of the present invention will be described, with reference to drawings. FIG. 1 is a block diagram showing an example of a configuration of the communication system of the first example embodiment of the present invention. As shown in FIG. 1, the communication system of the first example embodiment of the present invention includes a relay server 10, a client terminal 20 and an analysis device 30. There, the relay server 10, the client terminal 20 and the analysis device 30 are connected with each other via communication lines or a communication network such as a LAN (Local Area Network). Further, the relay server 10 is connected to an external network 40 which is a communication network such as the Internet.

The client terminal 20 communicates with communication terminals (not illustrated) connected to the external network 40, via the relay server 10.

In response to a request from the client terminal 20, the relay server relays communication between the client terminal 20 and a communication terminal (not illustrated) connected to the external network 40.

Figure 2:
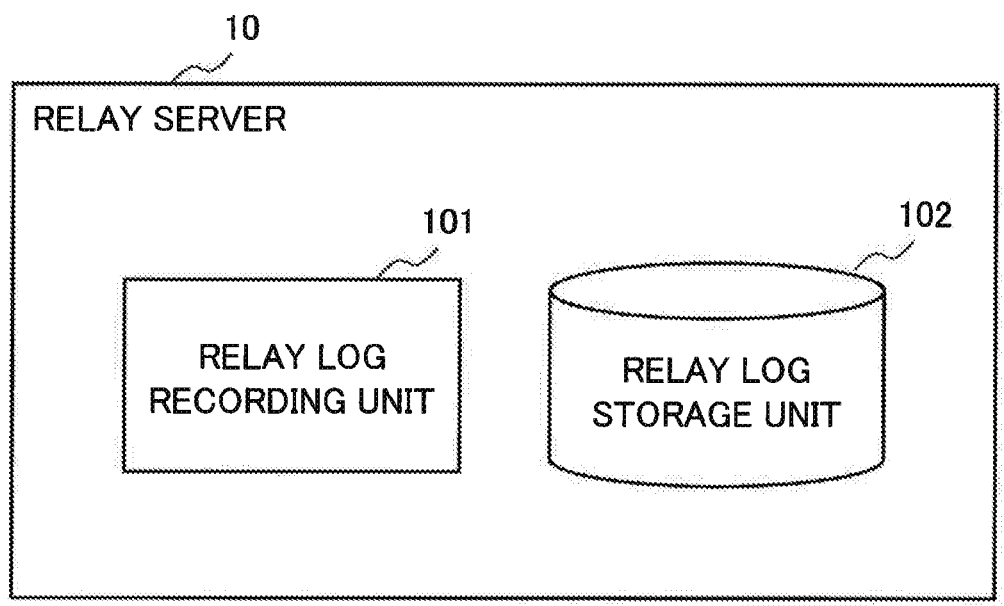
FIG. 2 is a block diagram showing an example of a configuration of a relay server according to the first example embodiment of the present invention.

FIG. 2 is a block diagram showing an example of a configuration of the relay server 10 in the first example embodiment of the present invention. As shown in FIG. 2, the relay server 10 in the first example embodiment of the present invention includes a relay log recording unit 101 and a relay log storage unit 102. Here, the relay server 10 is, for example, a proxy server for relaying HTTP communication, and has a function to relay communication.

The relay log recording unit 101 generates a relay log at each request from the client terminal 20 for relaying communication (relay request), and records the generated relay log into the relay log storage unit 102. The relay log is information representing a history of communication performed by the client terminal 20, in which at least request time information, connection destination server information and a connection identifier representing a connection between the client terminal 20 and the relay server 10 used for relaying communication are recorded. Here, the request time information is, for example, information representing a time at which a request for relaying communication (hereafter, referred to also as simply relaying) was received from the client terminal 20. The connection destination server information is, for example, information representing a partner of the communication performed by the client terminal 20. The connection identifier is, for example, a combination of an IP address and a port number of the client terminal 20 in TCP (Transmission Control Protocol) connection. Further, when a plurality of relay servers 10 are provided, an IP address and a port number of a relay server 10 in TCP connection may also be recorded into the relay log storage unit 102 as a relay log.

Into the relay log storage unit 102, a relay log generated at each relay request is recorded by the relay log recording unit 101. More specifically, the relay log stored in the relay log storage unit 102 is updated at each relay request, by the relay log recording unit 101. FIG. 3 is a diagram showing an example of a relay log stored in the relay log storage unit 102.

As shown in FIG. 3, the relay log represents request times at each of which relaying was requested, connection identifiers each consisting of an IP address and a port number of the client terminal 20 and connection destination servers. Specifically, as shown in FIG. 3, the relay log indicates that, at a request time "09:00:12", the client terminal 20 having an IP address "10.1.0.1" made connection to the relay server 10 by using a port numbered "20010", thereby requesting communication with a port numbered "80" of a server whose FQDN (Fully Qualified Domain Name) is identified by "malicious.example.com", and communication according to the request was performed.

Figure 4:
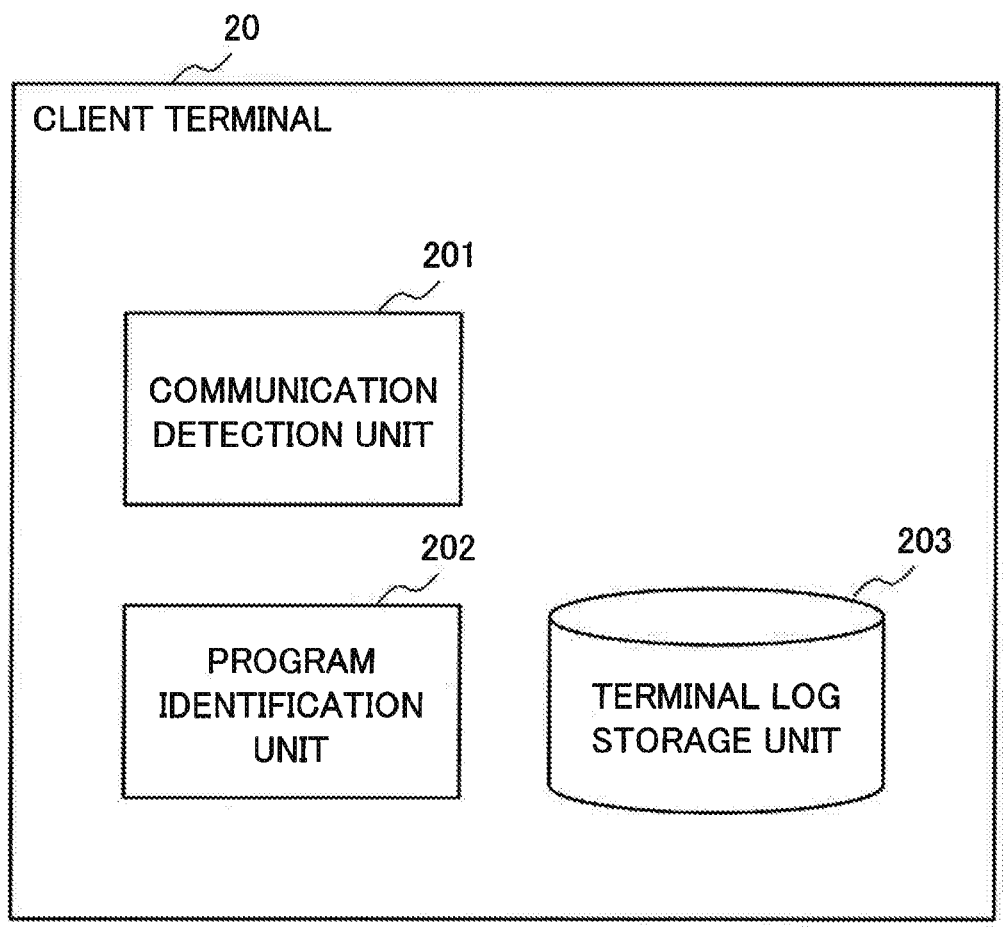
FIG. 4 is a block diagram showing an example of a configuration of a client terminal in the first example embodiment of the present invention.

Next, the client terminal 20 will be described. FIG. 4 is a block diagram showing an example of a configuration of the client terminal 20 in the first example embodiment of the present invention. As shown in FIG. 4, the client terminal 20 in the first example embodiment of the present invention includes a communication detection unit 201, a program identification unit 202 and a terminal log storage unit 203. Here, as already described above, the client terminal 20 has a function to send a relay request to the relay server 10 and thereby communicate via the relay server 10 with a server terminal connected to the external network 40.

The communication detection unit 201 detects a connection between the client terminal 20 and the relay server 10. Specifically, the communication detection unit 201 detects, for example, either or both of a start and an ending of communication.

With respect to the connection detected by the communication detection unit 201, the program identification unit 202 identifies a program having handled the connection. Further, the program identification unit 202 records, into the terminal log storage unit 203, a terminal log which is information about connections and is generated at each connection between the client terminal 20 and the relay server 10. The terminal log is stored in the terminal log storage unit 203. More specifically, the terminal log stored in the terminal log storage unit 203 is updated at each connection with the relay server 10, by the program identification unit 202.

The terminal log includes at least connection time information, a connection identifier and program information representing a program handling the connection. The connection time information is information representing, for a connection (communication) between the relay server 10 and the client terminal 20, one of the start time, the end time and a combination of the start and end times. The program information is information representing, for a program handling the connection, the name of an executable file, information representing a path and a hash value, or a combination of them.

FIG. 5 is a diagram showing an example of a terminal log stored in the terminal log storage unit 203. As shown in FIG. 5, the terminal log represents connection start times as connection time information, connection identifiers each consisting of an IP address and a port number of the client terminal 20, and information on paths of executable files as program information. Specifically, as shown in FIG. 5, the terminal log indicates that, at a time "09:00:12" and in the client terminal 20, a program with a path identified by "/Temp/malware.exe" started a connection with the relay server 10, using an IP address "10.1.0.1" and at a port numbered "20010".

Here, the terminal log and the relay log may be generically referred to as simply a log.

Figure 6:
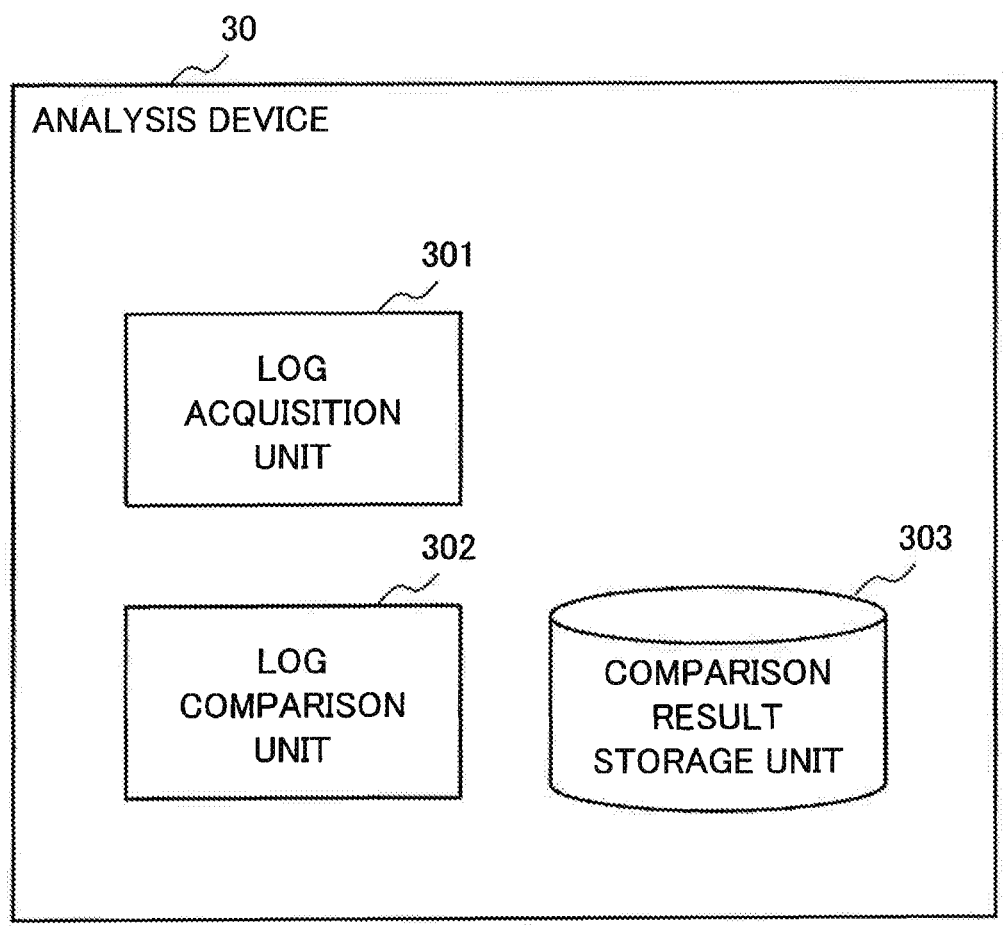
FIG. 6 is a block diagram showing an example of a configuration of an analysis device in the first example embodiment of the present invention.

Next, the analysis device 30 will be described. FIG. 6 is a block diagram showing an example of a configuration of the analysis device 30 in the first example embodiment of the present invention. As shown in FIG. 6, the analysis device 30 in the first example embodiment of the present invention includes a log acquisition unit 301, a log comparison unit 302 and a comparison result storage unit 303. Here, the analysis device 30 compares the relay log stored in the relay log storage unit 102 of the relay server 10 with the terminal log stored in the terminal log storage unit 203 of the client terminal 20. Then, on the basis of the comparison result, the analysis device 30 estimates a program having handled communication (a connection) in communication relayed by the relay server 10.

The log acquisition unit 301 acquires the relay log stored in the relay log storage unit 102 of the relay server 10 and the terminal log stored in the terminal log storage unit 203 of the client terminal 20.

The log comparison unit 302 compares the relay log and the terminal log both acquired by the log acquisition unit 301. Specifically, the log comparison unit 302 performs a comparison process in which request time information and connection identifiers included in the relay log are compared with connection time information and connection identifiers included in the terminal log, and accordingly correlates pieces of information concerning the same single communication sequence with each other. Then, the log comparison unit 302 records comparison result information representing the comparison result into the comparison result storage unit 303. The comparison result information represents at least time information, a connection identifier, program information and a connection destination.

In the comparison result storage unit 303, the comparison result information representing a result of the comparison performed by the log comparison unit 302 is stored. The comparison result information includes at least time information, a client identifier, program information and information representing a connection destination.

FIG. 7 is a diagram showing an example of the comparison result information stored in the comparison result storage unit 303. In the example shown in FIG. 7, it is indicated that there is stored, in the comparison result storage unit 303, a piece of comparison result information representing that, at a time "09:00:12" and in the client terminal 20, a program with a path identified by "/Temp/malware.exe" made communication with a port numbered "80" of a server identified by "malicious.example.com" via the relay server 10, using an IP address "10.1.0.1" and at a port numbered "20010".

Next, a description will be given of operation of the communication system of the first example embodiment of the present invention. Processes performed in the operation of the communication system of the first example embodiment of the present invention include a log recording process in which the relay server 10 and the client terminal 20 each record a log, and a comparison process in which the analysis device 30 acquires and compares the recorded logs.

FIG. 8 is a sequence diagram showing the log recording process in which the relay server 10 and the client terminal 20 each record a log, in the communication system of the first example embodiment of the present invention.

As shown in FIG. 8, when the client terminal 20 communicates with a communication terminal connected to the external network 40, the relay server 10 relays the communication (step S101). Then, the relay log recording unit 101 of the relay server 10 generates a relay log according to the communication performed by the client terminal 20 with a communication terminal connected to the external network 40, and records the relay log into the relay log storage unit 102 (step S102). In the process of the step S102, at least request time information and a connection identifier are recorded into the relay log storage unit 102, as the relay log.

In the client terminal 20, when the communication detection unit 201 detects a connection with the relay server 10 (step S103), the program identification unit 202 identifies a program having handled the communication (step S104). Then, the program identification unit 202 records, into the terminal log storage unit 203, a terminal log including connection time information, a connection identifier and program information with respect to the connection detected by the communication detection unit 201 in the process of the step S103 (step S105).

In the client terminal 20, the communication detection function of the communication detection unit 201 can be implemented by using an API (Application Programming Interface) for implementing a client type firewall function provided in the OS (Operating System) installed in the client terminal 20. It is because the client type firewall needs to detect each start of communication in order to determine whether the communication is allowable or not. Further, an API for a client type firewall is usually configured such that by which program a detected connection is handled can be referred to, so as to enable to set a rule in terms of each program. By using such an API, the program identification function of the program identification unit 202 can be implemented in the client terminal 20.

FIG. 9 is a sequence diagram showing the comparison process in which the analysis device 30 acquires and compares recorded logs, in the communication system of the first example embodiment of the present invention.

First, the log acquisition unit 301 of the analysis device 30 acquires a relay log from the relay log storage unit 102 (step S201) and also acquires a terminal log from the terminal log storage unit 203 (step S202). In the processes of the steps S201 and S202, the log acquisition unit 301 may acquire the logs in their entirety, or may designate a condition for the time range or the like and thereby acquire only part of the logs satisfying the designated condition. Subsequently, the log comparison unit 302 performs the comparison process between the relay log acquired by the log acquisition unit 301 in the processes of the steps S201 and the terminal log acquired by the log acquisition unit 301 in the processes of the steps S202 (step S203). The log comparison unit 302 records a result of the comparison performed in the process of the step S203 into the comparison result storage unit 303 (step S204).

Hereinafter, a description will be given of the comparison process between the relay log and the terminal log performed by the log comparison unit 302 in the process of the step S203. First, the log comparison unit 302 searches for and extracts a row of the terminal log which includes a connection identifier identical to a connection identifier included in the relay log. Accordingly, it is certain that one row is extracted from each of the relay log and the terminal log, in relation to the same single communication sequence. However, there is a possibility that more than one rows are extracted from the terminal log in relation to a single row of the relay log. For example, such an event occurs if a port was reused in the client terminal 20. To prevent occurrence of such an event, the log comparison unit 302 performs filtering on one or more rows extracted from the terminal log, on the basis of time information.

Specifically, on the basis of request time information and connection time information, the log comparison unit 302 extracts only rows from the respective logs which highly possibly are ones concerning the same single communication sequence. Here, there may be inconsistency between time setting in the relay server 10 and that in the client terminal 20. In this respect, the log comparison unit 302 extracts rows for which the difference between a time indicated by request time information included in one of the rows and a time indicated by connection time information included in the other row is smaller than a predetermined threshold value, instead of extracting only rows one of which includes a time indicated by request time information coincident with a time indicated by connection time information included in the other row. Here, the log comparison unit 302 may be configured to extract rows for which the above-described difference is smallest.

It is general that reuse of a port by another program occurs after some amount of time elapses. Therefore, by performing filtering on the basis of time information as described above, it becomes possible to prevent such an event as described above. As a result, in relation to a row of the relay log, the log comparison unit 302 can extract only one row from the terminal log which is estimated to have been generated by the same single communication sequence as that by which the row of the relay log was generated.

Accordingly, the log comparison unit 302 can correlate a row extracted from the relay log with a row extracted from the terminal log. As a result, a connection destination included in the row extracted from the relay log is correlated with a program included in the row extracted from the terminal log, and it accordingly is possible to identify whether the communication is performed by malware or not and identify a connection destination of the communication. Consequently, according to the identification result, whether an unauthorized access was performed or not can be detected.

According to the present example embodiment, the relay server 10 acquires a relay log including request time information, connection identifiers and connection destination servers, and the client terminal 20 acquires a terminal log including connection time information and connection program information. Then, by comparing the relay log with the terminal log, the analysis device can recognize a correspondence relationship between a connection destination server and a program having handled communication with the connection destination server.

Therefore, according to the present example embodiment, an access by a program other than a web browser can be detected with no need for the client terminal 20 to analyze an HTTP header and thereby identify a connection destination server. As a result, it becomes possible to detect an unauthorized access by malware or the like, according to the present example embodiment.

Incidentally, in HTTP communication, there may be performed persistent connection in which more than one HTTP requests are made using a single TCP connection. When persistent connection is performed, in contrast to that the relay log stored in the relay log storage unit 102 is updated at each relay request, the terminal log stored in the terminal log storage unit 203 is updated once at each TCP connection. More specifically, in contrast to that one row is added to the relay log stored in the relay log storage unit 102 at each relay request, one row is added to the terminal log stored in the terminal log storage unit 203 at each TCP connection. Accordingly, correspondence between rows of the relay log and those of the terminal log becomes not on a one-to-one basis.

Further, in persistent connection, the connection time may be longer than a processing time for a single request (a connection which is not persistent connection). Accordingly, there may occur a large difference between the start time of a TCP connection (for example, a time represented by connection time information) and the last request time within the persistent connection (for example, a time represented by request time information). As a result, when filtering is performed on the basis of only a time difference in start time, as in the process in the present example embodiment, it is possible that the comparison process by the log comparison unit 302 is not performed appropriately.

To avoid such a situation, it is desirable to have a configuration in which connection time information in the terminal log represents both of the connection start time and the connection end time of a connection. That is, when a time represented by a piece of request time information in the relay log is in-between connection start and connection end times represented by a piece of connection time information, the log comparison unit 302 performs the comparison process such that a row including the piece of request time information in the relay log is correlated with a row including the piece of connection time information in the terminal log. Here, it is assumed that inconsistency between time set in the relay server 10 and that in the client terminal 20 is taken into account, as already described above.

When the above-described configuration is employed, the log comparison unit 302 can perform the comparison process appropriately even when a persistent connection is held for a long time.

Example Embodiment 2

Figure 10:
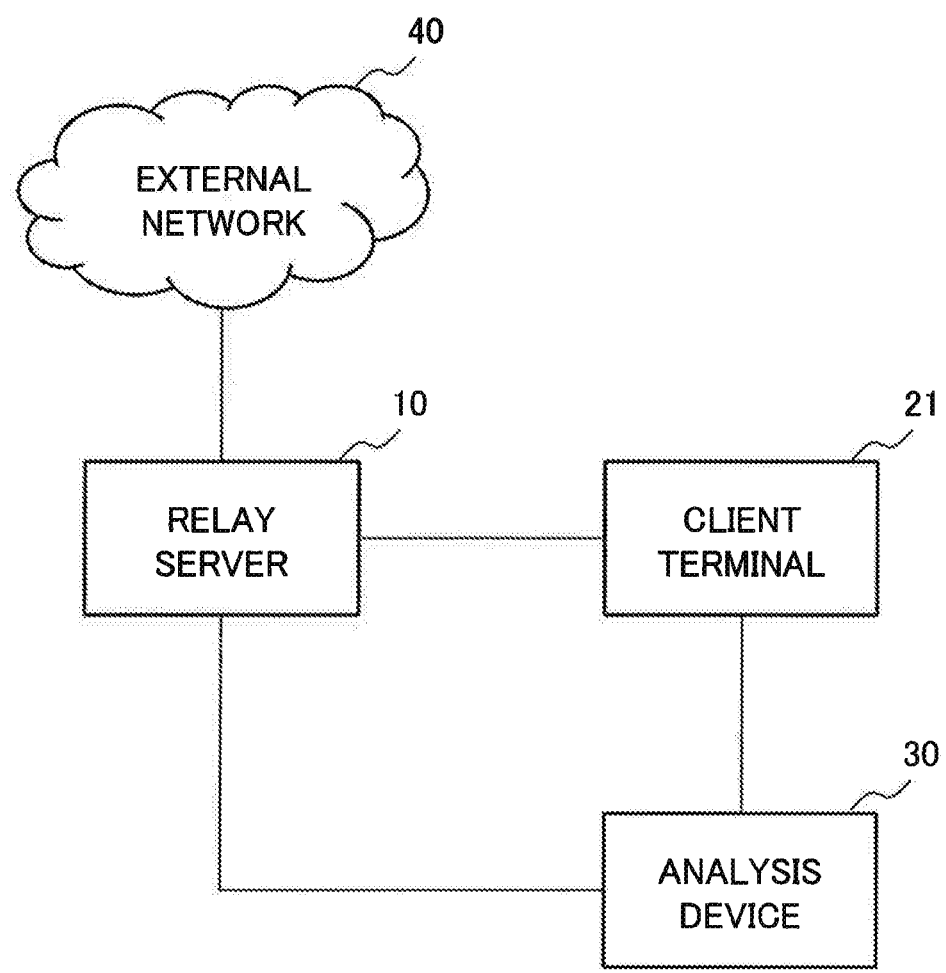
FIG. 10 is a block diagram showing an example of a configuration of a communication system of a second example embodiment of the present invention.

Next, a communication system of a second example embodiment of the present invention will be described, with reference to drawings. FIG. 10 is a block diagram showing an example of a configuration of the communication system of the second example embodiment of the present invention. As shown in FIG. 10, the communication system of the second example embodiment of the present invention is different from the configuration in the first example embodiment in that it includes a client terminal 21 in place of the client terminal 20. The rest of the configuration is the same as that of the configuration in the first example embodiment shown in FIG. 1, and accordingly, to such identical constituents, identical signs to those in FIG. 1 are assigned, and their descriptions will be omitted here.

Figure 11:
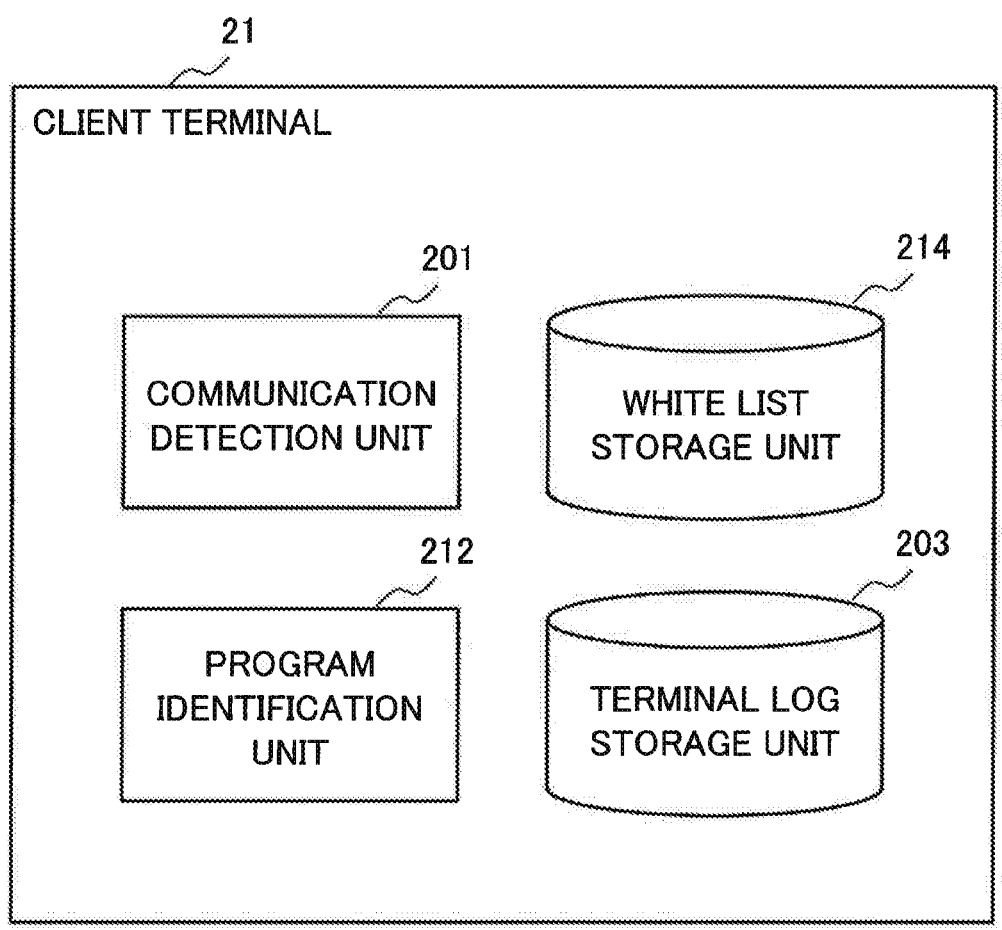
FIG. 11 is a block diagram showing an example of a configuration of a client terminal in the second example embodiment of the present invention.

FIG. 11 is a block diagram showing an example of a configuration of the client terminal 21 in the second example embodiment of the present invention. As shown in FIG. 11, the client terminal 21 in the second example embodiment of the present invention includes a white list storage unit 214 in addition to the configuration of the client terminal 20 in the first example embodiment of the present invention shown in FIG. 4. As also shown in FIG. 11, the client terminal 21 in the second example embodiment of the present invention includes a program identification unit 212 in place of the program identification unit 202 in the client terminal 20 in the first example embodiment of the present invention shown in FIG. 4. The rest of the configuration of the client terminal 21 in the second example embodiment of the present invention is the same as that of the configuration of the client terminal 20 in the first example embodiment of the present invention shown in FIG. 4, and accordingly, to such identical constituents, identical signs to those in FIG. 4 are assigned, and their descriptions will be omitted here.

In the white list storage unit 214, a white list for determining whether or not to hold each terminal log is stored. The white list is a list of pieces of program information for which no terminal log needs to be recorded into the terminal log storage unit 203.

Figure 12:
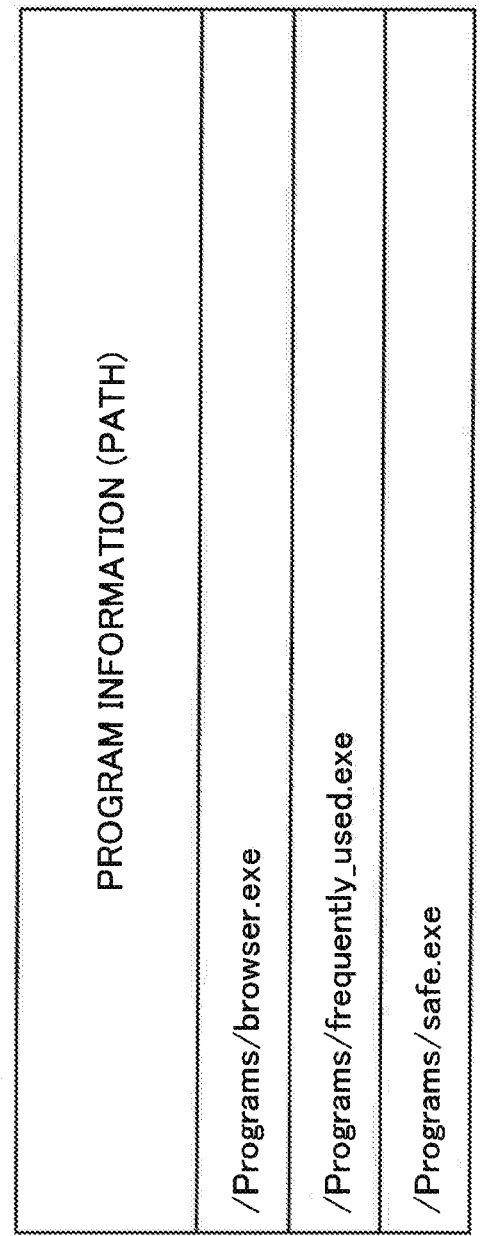
FIG. 12 is a diagram showing an example of a white list stored in a white list storage unit.

FIG. 12 is a diagram showing an example of a white list stored in the white list storage unit 214. In the example shown in FIG. 12, "/Programs/browser.exe" is registered in the white list. Accordingly, for example, when the program identification unit 212 identifies a program having handled a connection detected by the communication detection unit 201 to be equal to "/Programs/browser.exe", it does not perform an update process of adding information according to operation of the program to the terminal log.

Here, in the white list, web browsers and programs determined to have high safety are registered, for example.

In the program identification unit 212, operation performed when recording a terminal log into the terminal log storage unit 203 is different from that of the program identification unit 202 in the first example embodiment. Specifically, the program identification unit 212 determines whether or not to record a terminal log into the terminal log storage unit 203 by referring to the white list stored in the white list storage unit 214. More specifically, the program identification unit 212 determines whether or not to record information according to operation of a program having handled a connection detected by the communication detection unit 201 into the terminal log stored in the terminal log storage unit 203, on the basis of the white list stored in the white list storage unit 214.

That is, when a program having handled a connection detected by the communication detection unit 201 is equal to any one of programs registered in the white list, the program identification unit 212 does not perform an update process of adding information according to operation of the program to the terminal log stored in the terminal log storage unit 203. In other words, when a program having handled a connection detected by the communication detection unit 201 is equal to none of programs registered in the white list, the program identification unit 212 performs an update process of adding information according to operation of the program to the terminal log stored in the terminal log storage unit 203.

FIG. 13 is a diagram showing an example of a terminal log in a case of performing such an update process. In the terminal log illustrated in FIG. 13, among the rows in the terminal log shown in FIG. 5, the row with program information representing "/Programs/browser.exe" is excluded.

That is, part of information according to operation of programs having handled connections detected by the communication detection unit 201 was not recorded into the terminal log by the effect of the white list. As a result, in a result of comparison by the analysis device 30, there appears a row, among those of the relay log, which is correlated with none of the rows of the terminal log.

FIG. 14 is a diagram showing a comparison result between the terminal log shown in FIG. 13 and the relay log shown in FIG. 3. In the example shown in FIG. 14, into the terminal log, rows corresponding to the third and fourth rows of the relay log are not recorded. As a result, in relation to each of those rows, program information representing a program having handled the connection is not acquired by the analysis device 30.

Accordingly, the log comparison unit 302 records comparison result information representing a comparison result with program information not acquired in the comparison process being denoted as empty, into the comparison result storage unit 303. In the comparison result information, with respect to each of the rows with program information denoted as empty, a program having caused update registration into the relay log is not specified. However, it is obvious that the program is any one of programs included in the white list. Then, when the programs registered in the white list have high safety, it is considered that the necessity of further analysis of operation relating to the rows in the relay log and the comparison result information is low. Further, information according to communication by a web browser is recorded into a storage means (not illustrated) by the web browser of the client terminal 21. Therefore, by the information, the communication can be confirmed to be that by a web browser.

According to the present example embodiment, a terminal log according to communication by a web browser or a program having high safety registered in the white list is not recorded. By employing the configuration, in an environment where communication using a web browser accounts for a large proportion of communication with an external network, it is possible to significantly reduce the data amount of the terminal log recorded into the terminal log storage unit 203. Simultaneously, the data amount of the terminal log to be acquired by the analysis device 30 can also be reduced significantly.

While, in the present example embodiment, the white list is used for determining whether or not to perform update registration of information into the terminal log, the configuration may be such that the white list is used for determining whether or not to send information registered in the terminal log to the analysis device 30.

When such a configuration is employed, the client terminal 21 performs update registration of information into the terminal log stored in the terminal log storage unit 203 regardless of the content registered in the white list. Then, the configuration is made such that, when the log acquisition unit 301 of the analysis device 30 acquires the terminal log from the terminal log storage unit 203, whether to acquire only rows of the terminal log concerning programs not matching program information registered in the white list or to entirely acquire the terminal log can be selected by a user's operation, for example.

Then, when the user selects acquisition of only rows concerning programs not matching program information registered in the white list, the log acquisition unit 301 of the analysis device 30 acquires, out of the terminal log stored in the terminal log storage unit 203, only rows concerning programs not matching program information registered in the white list.

When the above-described configuration is employed, the data amount of a terminal log sent from the client terminal 21 to the analysis device 30 can be reduced. Further, because the analysis device 30 can acquire even the entire terminal log, it becomes possible to deal with also a situation where recognition of communication performed by any one of the programs registered in the white list is desired.

Example Embodiment 3

Figure 15:
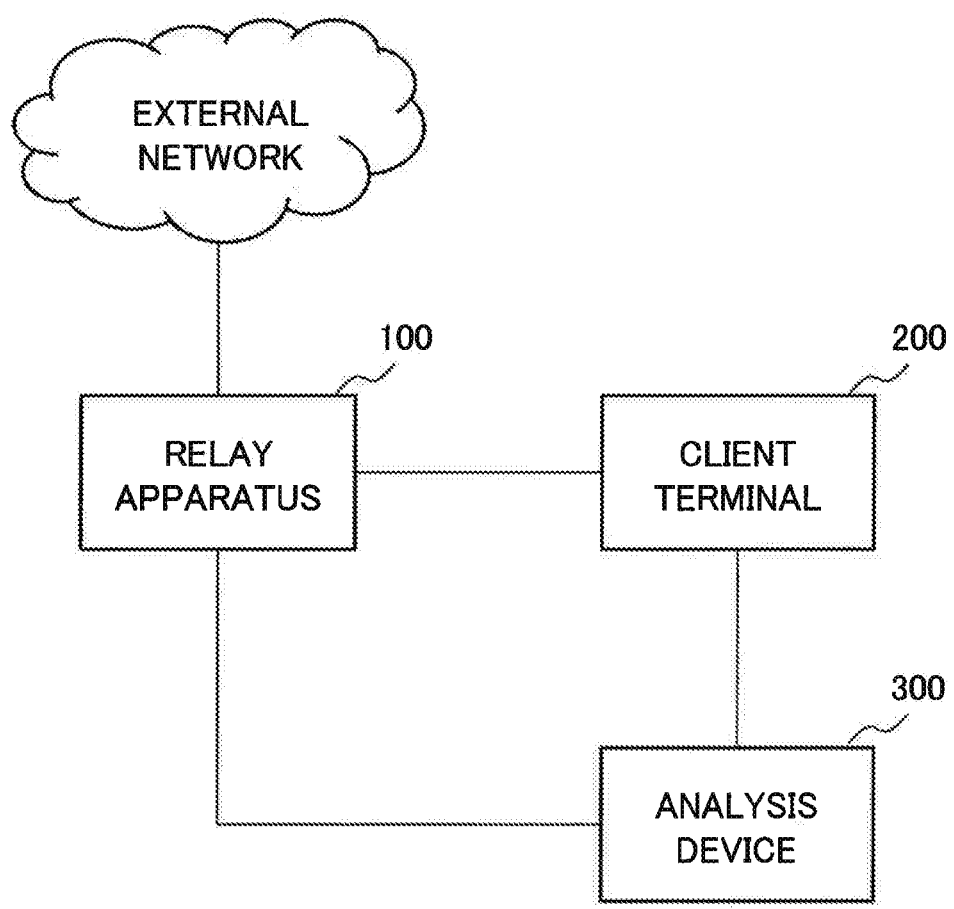
FIG. 15 is a block diagram showing an example of a configuration of a log analysis system of a third example embodiment of the present invention.

Next, a log analysis system of a third example embodiment of the present invention will be described, with reference to drawings. FIG. 15 is a block diagram showing an example of a configuration of the log analysis system of the third example embodiment of the present invention. As shown in FIG. 15, the log analysis system of the third example embodiment of the present invention includes a client terminal 200, a relay apparatus 100 and an analysis device 300.

Here, the client terminal 200 corresponds to, for example, the client terminal 20 in the first example embodiment of the present invention shown in FIG. 1 and the client terminal 21 in the second example embodiment. Further, the relay apparatus 100 corresponds to, for example, the relay server 10 in the first example embodiment of the present invention shown in FIG. 1. The analysis device 300 corresponds to, for example, the analysis device 30 in the first example embodiment of the present invention shown in FIG. 1.

The client terminal 200 communicates with external communication apparatuses. In response to a request from the client terminal 200, the relay apparatus 100 relays communication between an external communication apparatus and the client terminal 200. The analysis device 300 analyzes the content of communication performed by the client terminal 200.

Further, the client terminal 200 records program information representing programs having handled the communication with external communication apparatuses.

The relay apparatus 100 records a relay log representing each request from the client terminal 200 for communication with an external communication apparatus.

Further, the analysis device 300 compares the program information with the relay log.

By employing such a configuration, it is possible to detect an unauthorized access.

Example Embodiment 4

Figure 16:
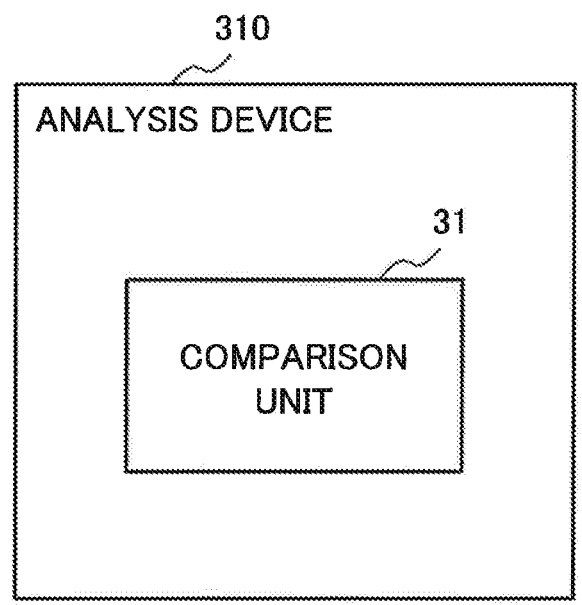
FIG. 16 is a block diagram showing an example of a configuration of an analysis system of a fourth example embodiment of the present invention.

Next, an analysis device of a fourth example embodiment of the present invention will be described, with reference to drawings. FIG. 16 is a block diagram showing an example of a configuration of the analysis device 310 of the fourth example embodiment of the present invention.

As shown in FIG. 16, the analysis device 310 of the fourth example embodiment of the present invention includes a comparison unit 31 which compares program information recorded by a client terminal performing communication with external communication apparatuses, the program information representing programs having handled the communication with the external communication apparatuses, with a relay log recorded by a relay apparatus relaying the communication between the external communication apparatuses and the client terminal in response to a request from the client terminal, the relay log representing each request from the client terminal for communication with the external communication apparatuses.

Here, the comparison unit 31 corresponds to, for example, the log comparison unit 302 in the first example embodiment of the present invention shown in FIG. 1.

By employing such a configuration, it is possible to detect an unauthorized access.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-041454, filed on Mar. 3, 2015, the disclosure of which is incorporated herein in its entirety by reference.

REFERENCE SIGNS LIST 10 relay server
20, 21, 200 client terminal
30, 300, 310 analysis device
31 comparison unit
40 external network 100 relay apparatus
101 relay log recording unit
102 relay log storage unit
201 communication detection unit
202, 212 program identification unit
203 terminal log storage unit
214 white list storage unit
301 log acquisition unit
302 log comparison unit
303 comparison result storage unit

The invention claimed is:

1. A log analysis system, comprising:
a client terminal configured to communicate with external communication apparatuses;
a relay apparatus configured to relay communication between the external communication apparatuses and the client terminal, in response to a request from the client terminal; and
an analysis device configured to analyze content of communication performed by the client terminal,
wherein:
the client terminal records a terminal log including program information that represents programs operative in the client terminal that have handled communication with the relay apparatus and includes names of executable files and paths of executable files, connection time information, and connection identifiers each including an internet protocol (IP) address and a port number of the client terminal, for each connection between the client terminal and the relay apparatus;
the relay apparatus records a relay log including request time information, the connection identifiers, and connection destination servers that are partners of the client terminal and are indicated by using fully qualified domain names (FQDNs) of the connection destination servers, for each request from the client terminal for communication with the external communication apparatuses; and
the analysis device estimates a connection destination server and a program handling communication with the connection destination server, by comparing the connection time information and the connection identifiers in the terminal log with the request time information and the connection identifiers in the relay log, and identifies whether an unauthorized access was performed by comparing the estimated connection destination server and the program handling communication with the connection destination server.

2. The log analysis system according to claim 1, wherein a list is stored in the client terminal, in which programs are registered as not to be subject to recording into the terminal log by the client terminal.

3. The log analysis system according to claim 1, wherein, in the client terminal, a list is stored in which programs, from among programs included in the recorded contents, are registered as not to be subject to comparison by the analysis device.

4. An analysis device for analyzing content of communication performed by a client terminal, comprising:
at least one memory configured to store one or more instructions; and
at least one professor configured to execute the one or more instructions to:
acquire a terminal log from a client terminal that communicates with external communication apparatuses, the terminal log including program information recorded by the client terminal that represents programs operative in the client terminal that have handled communication between the client terminal and a relay apparatus and includes including names of executable files and paths of executable files, connection time information, and connection identifiers each including an internet protocol (IP) and a port number of the client terminal, for each connection between the client terminal and the relay apparatus;
acquire a relay log, recorded by the relay apparatus configured to relay communication between the external communication apparatuses and the client terminal in response to a request from the client terminal, the relay log including request time information, the connection identifiers, and connection destination servers that are partners of the client terminal and are indicated by using fully qualified domain names (FQDNs) of the connection destination servers, for each request from the client terminal for communication with the external communication apparatuses; and
estimate a connection destination server and a program handling communication with the connection destination server, by comparing the connection time information and the connection identifiers in the terminal log with the request time information and the connection identifiers in the relay log, and identify whether an unauthorized access was performed by comparing the estimated connection destination server and the program handling communication with the connection destination server.

5. The analysis device according to claim 4, wherein a list is stored in the client terminal, in which programs are registered as not to be subject to recording into the terminal log by the client terminal.

6. The analysis device according to claim 4, wherein, in the client terminal, a list is stored in which programs, from among programs included in the recorded contents, are registered as not to be subject to comparison by the analysis device.

7. An analysis method, comprising:
comparing i) information acquired from a terminal log of a client terminal configured to communicate with external communication apparatuses, the terminal log including program information recorded by the client terminal that represent programs operative in the client terminal that have handled communication between the client terminal and a relay apparatus and includes names of executable files and paths of executable files, connection time information, and connection identifiers each including an internet protocol (IP) address and a port number of the client terminal, for each connection between the client terminal and the relay apparatus, with ii) information acquired from a relay log recorded by the relay apparatus configured to relay communication between the external communication apparatuses and the client terminal in response to a request from the client terminal, the relay log including request time information, the connection identifiers, and connection destination servers that are partners of the client terminal and are indicated by using fully qualified domain names (FQDNs) of the connection destination servers, for each request from the client terminal for communication with the external communication apparatuses; and
estimating a connection destination server and a program handling communication with the connection destination server, by comparing the connection time information and the connection identifiers in the terminal log with the request time information and the connection identifiers in the relay log, and identifying whether an unauthorized access was performed by comparing the estimated connection destination server and the program handling communication with the connection destination server.

8. The analysis method according to claim 7, wherein a list is stored in the client terminal, in which programs are registered as not to be subject to recording into the terminal log by the client terminal.

9. The analysis method according to claim 7, wherein, in the client terminal, a list is stored in which programs, from among programs included in the recorded contents, are registered as not to be subject to comparison by the analysis device.

* * * * *